United States Patent [19]
Wakamiya et al.

[11] Patent Number: 5,323,659
[45] Date of Patent: Jun. 28, 1994

[54] MULTIFUNCTIONAL TORQUE SENSOR

[75] Inventors: Masayuki Wakamiya, Suita; Hiroyuki Hase, Kyoto; Rihito Shoji, Yawata, all of Japan

[73] Assignee: Matsushita Electric Industrial Co., Ltd., Osaka, Japan

[21] Appl. No.: 126,027

[22] Filed: Sep. 24, 1993

Related U.S. Application Data

[63] Continuation of Ser. No. 697,394, May 9, 1991, abandoned.

[30] Foreign Application Priority Data

May 17, 1990 [JP] Japan ................................. 2-128467

[51] Int. Cl.[5] ................................................ G01L 3/00
[52] U.S. Cl. ............................... 73/862.28; 73/862.333
[58] Field of Search .................... 73/862.28, 862.332, 73/862.333, 862.334, 862.335

[56] References Cited

U.S. PATENT DOCUMENTS

| | | | |
|---|---|---|---|
| 2,331,934 | 10/1943 | Satterlee | 324/163 |
| 2,746,289 | 5/1956 | Cline | 324/163 |
| 3,762,217 | 10/1973 | Hagen | 73/862.28 |
| 3,935,537 | 1/1976 | Batchelor | 324/166 |
| 3,978,718 | 9/1976 | Schorsch | 73/862.28 |
| 4,152,645 | 5/1979 | Bendler | 73/862.28 |
| 4,364,278 | 12/1982 | Horter et al. | 73/862.36 |
| 4,479,390 | 10/1984 | Meixner | 73/862.333 |
| 4,823,617 | 4/1989 | Hase et al. | |

FOREIGN PATENT DOCUMENTS 60-260821 12/1985 Japan.
63-163243 7/1988 Japan.

Primary Examiner—Richard E. Chilcot, Jr.
Assistant Examiner—R. Biegel
Attorney, Agent, or Firm—Stevens, Davis, Miller & Mosher

[57] ABSTRACT

A multifunctional torque sensor comprises a torque transmission shaft, a rectangle-shaped or parallelogram-shaped magnetic material strip bonded on the surface of the torque transmission shaft so that opposite sides of the rectangle or parallelogram face each other with a gap interposed therebetween, a first coil concentrically wound around the magnetic material strip, amagnetic core disposed outside of the magnetic material strip in no contact therewith through a space, and a second coil wound around the magnetic material strip. A change in magnetic characteristic caused by a stress transmitted from the torque transmission shaft to the magnetic material strip is detected by the first coil, thereby detecting a torque. The rotation of the shaft is detected through the detection of the gap by the second coil upon rotation of the shaft. A power can be operationally determined from the detected torque and rotation.

8 Claims, 14 Drawing Sheets

FIG. IA
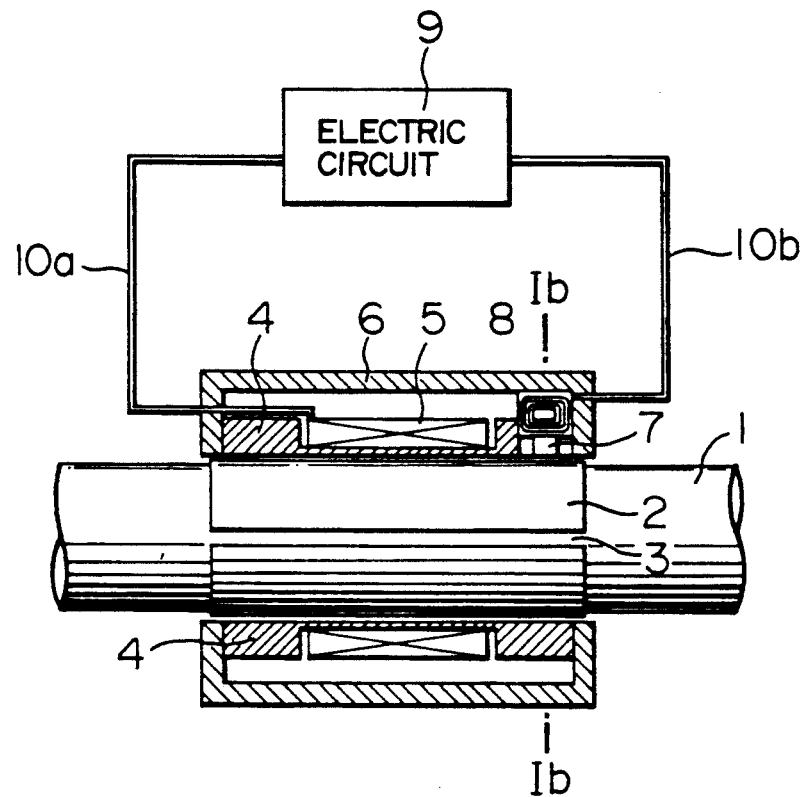
FIG. IB
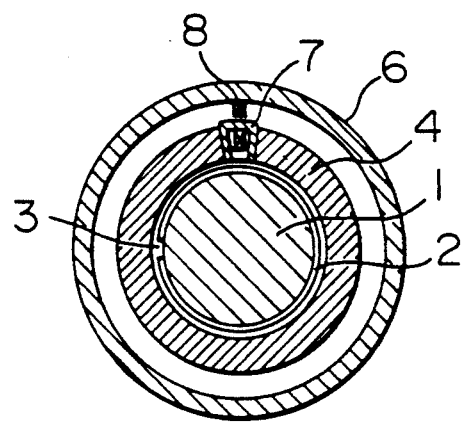

MULTIFUNCTIONAL TORQUE SENSOR

This application is a continuation of application Ser. No. 07/697,394, filed May 9, 1991, now abandoned.

BACKGROUND OF THE INVENTION

1. Field of the Invention

The present invention relates to a torque sensor in which a torque applied or transmitted to a torque transmission shaft is detected in a non-contact manner by use of a so-called stress-magnetic effect in which a member made of a magnetic material exhibits a change in a magnetic permeability when an external stress is applied to the magnetic material member, and also to a multifunctional torque detection device in which a power (or horse power) is operationally detected or determined by detecting the rotation (or r.p.m.) of the torque transmission shaft in a non-contact relation with the torque transmission shaft by use of a magnetic means simultaneously with the detection of the torque.

2. Description of the Related Art

Recently, the development of sensors for mechanical quantities using the stress-magnetic effect has come into the lime light. For example, torque sensors using this principle have been disclosed by U.S. Pat. Nos. 4,823,617, JP-A-61-312250, and so on.

The construction of this kind of conventional torque sensor will now be explained in reference to FIG. 13.

In the figure, reference numeral 61 denotes a torque transmission shaft, numerals 62a and 62b amorphous magnetic alloy members having magnetostriction, numerals 63a and 63b coils, and numeral 64 a differential detection circuit. The torque transmission shaft 61 and the amorphous magnetic alloy members 62a and 62b are bonded to each other by a bonding agent such as a polyimide series resin, and the bonding agent is cured at a temperature higher than a working temperature region of the sensor so that an in-plane internal compressive stress is applied to the amorphous magnetic alloy members 62a and 62b due to a difference in linear thermal expansion coefficient between the torque transmission shaft 61 and the amorphous magnetic alloy members 62a and 62b. The coils 63a and 63b are wound centering around the torque transmission shaft 61 and are connected to the differential output or detection circuit 64.

When a torque is applied to the torque transmission shaft 61, strains are generated in the amorphous magnetic alloy members 62a and 62b. Thereby, a magnetic permeability changes due to a stress-magnetic effect. As a result, the inductances of the coils 63a and 63b change. For example, in the case of a right-handed (or right-twisted) torque, the inductance of the coil 63a becomes large and the inductance of the coil 63b becomes small. This change is detected by the differential detection circuit 64, thereby permitting simultaneous detection of the magnitude and direction of the applied torque.

In such a conventional torque sensor, the magnitude and direction of a torque transmitted to the torque transmission shaft 61 can be detected. However, in the case where a power (or horse power) is to be determined, the rotation (or r.p.m.) of the shaft 61 necessary for the determination of the power must be detected by means of an additionally provided rotation sensor. Thus, the conventional torque sensor has a drawback that the power cannot be detected by the torque sensor itself.

SUMMARY OF THE INVENTION

An object of the present invention made to solve the above problem is to provide a multifunctional torque sensor which is capable of not only detecting the rotation of a torque transmission shaft in a non-contact manner with no modification of the fundamental construction of the conventional torque sensor but also monitoring a torque, the rotation and a power.

To achieve the above object, the present invention provides a torque sensor in which a magnetic material strip having magnetostriction is secured to the surface of a torque transmission shaft and a torque is detected in such a manner that a change in magnetic characteristic caused by a stress transmitted from the torque transmission shaft to the magnetic material strip is detected from a change in impedance of a first detection coil concentrically wound around the torque transmission shaft upon application of an a.c. voltage to the first detection coil, wherein the magnetic material strip is secured onto an outer peripheral surface of the torque transmission shaft with the outer periphery of the magnetic material strip being shaped into a rectangle or parallelogram and with opposite sides of the rectangle or parallelogram facing each other with a gap interposed therebetween, a magnetic core having a second detection coil wound therearound and supplied with an a.c. voltage independently of a torque detection circuit is disposed outside of the magnetic material strip in no contact therewith through a space, and the rotation of the torque transmission shaft is detected through the detection of the gap obtained from a change of the voltage of the second detection coil upon rotation of the torque transmission shaft, whereby the torque and the revolution of the torque transmission shaft can be detected simultaneously. Also, a power can be determined by subjecting the values of the torque and the rotation to a multiplication processing. Thereby, a multifunctional torque sensor can be realized.

BRIEF DESCRIPTION OF THE DRAWINGS

FIG. 1A is a view showing the structure of a torque sensor according to a first embodiment of the present invention;

FIG. 1B is a cross section taken along line A—A in FIG. 1A;

DESCRIPTION OF THE PREFERRED EMBODIMENTS

Figure 2A:
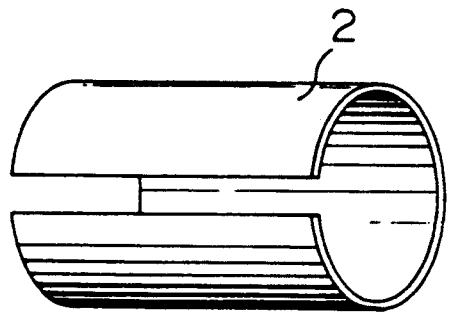
FIG. 2A is a view showing an amorphous magnetic alloy strip which is used in the first embodiment and a second embodiment of the present invention, the curvature of a surface of the amorphous magnetic alloy strip being made the same as that of the surface of a torque transmission shaft by annealing.

FIG. 1A is a view showing the structure of a torque sensor according to a first embodiment of the present invention and FIG. 1B is a cross section taken along line A—A in FIG. 1A. In the figures, reference numeral 1 denotes a torque transmission shaft which has a diameter of 30 mm and is made of titanium. The torque transmission shaft 1 has a linear thermal expansion coefficient of $9.4 \times 10^{-6}$ (1/°C.) in a temperature region of $-30°$ C. to 250° C. and a Young's modulus of 11600 (kgf/mm$^2$). Numeral 2 denotes a rectangle-shaped amorphous magnetic alloy strip which has a width of 40 mm, a length of 90 mm and a thickness of about 25 μm and is formed in such a manner that an amorphous magnetic alloy fabricated in the atmosphere by a rapid-quenching process using the single-roll technique is shaped into a rectangle by etching. The amorphous magnetic alloy strip 2 has a composition of $(Fe_{95}Cr_5)_{7.9}Si_{12.5}B_{8.5}$, a saturation magnetostriction constant of $22 \times 10^{-6}$ and a linear thermal expansion coefficient of $7.8 \times 10^{-6}$ (1/°C.) which is smaller than the linear thermal expansion coefficient of the torque transmission shaft 1 by $1.6 \times 10^{-6}$ (1/°C.).

The rectangle-shaped amorphous magnetic alloy strip is annealed in a vacuum condition at a temperature higher than a Curie temperature and lower than a crystallization temperature while the rectangle-shaped amorphous magnetic alloy strip is wound on a tool with a similar curvature to the torque transmission shaft so that the longer sides of the rectangle are parallel to a circumferential direction of the torque transmission shaft. Thereby, a surface of the strip which was in contact with a roll upon fabrication of the strip has a curvature of 30 mmφ which is the same as a surface curvature of the torque transmission shaft, as shown in FIG. 2A. Thereafter, the amorphous magnetic alloy strip is bonded to the torque transmission shaft of 30 mm diameter by a bonding agent.

An addition polymerization type bismaleimidotriazine resin (BT2164 manufactured by Mitsubishi Gas Chemicals Co., Ltd.) was used as the bonding agent. The bonding was conducted by rapidly raising the temperature of the structure up to a temperature of 250° C. which is higher than a working temperature 150° C. of the torque sensor by 100° C. and thereafter maintaining the structure at the higher temperature for two hours. Thereby, an in-plane compressive stress is liberated in the amorphous magnetic alloy strip in a working temperature region of the torque sensor from $-50°$ C. to $+150°$ C. Also, the rectangle-shaped amorphous magnetic alloy strip was bonded onto the torque transmission shaft 1 so that shorter sides of the rectangle-shaped amorphous magnetic alloy strip face each other with a gap 3 of about 4 mm being interposed therebetween. A torque is detected in such a manner that a change in magnetic characteristic or magnetic permeability caused by a stress (or strain) transmitted from the torque transmission shaft 1 to the amorphous magnetic alloy strip 2 is detected from a change in impedance of a torque detection coil 5 wound concentrically with the torque transmission shaft 1 around a bobbin 4 which is made of Teflon. The number of turns of the coil 5 was 100. Reference numeral 6 denotes a 45%Ni-Fe magnetic material member which has a high magnetic permeability. Numeral 7 denotes a horseshoe-shaped magnetic core which is made of ferrite and has a high magnetic permeability. The magnetic core 7 has a thickness of 2 mm in a circumferential direction and a thickness of 4 mm in an axial direction. A distance between magnetic poles of the magnetic core 7 in the circumferential direction is 2 mm and the magnetic core 7 is disposed outside of the rectangle-shaped amorphous magnetic alloy strip 2 in no contact therewith through a space of 1 mm. Further, a rotation detection coil 8 is wound with 20 turns around the magnetic core 7. Numeral 9 denotes an electric circuit which includes circuits for detection of a torque and a rotation and also includes an electronic circuit capable of operating or calculating a so-called power from the value of torque and the value of rotation. An AC current of 30 kHz was flown in the torque detection coil 5 to produce an alternating magnetic field of 1[Oe] (oersted). Also,, an AC current of 100 kHz and 10 mA was flown in the rotation detection coil 8. Numerals 10a and 10b denote conductors which connect the torque detection coil 5 and the rotation detection coil 8 to the electric circuit 9.

Figure 3A:
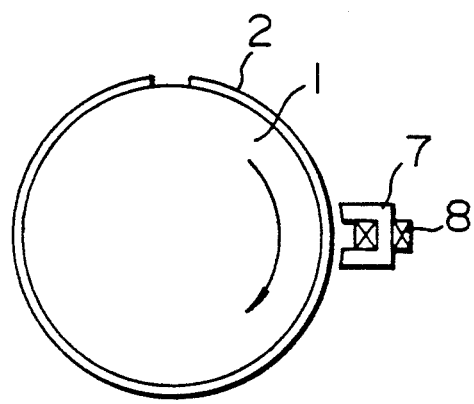
FIGS. 3A to 3C are views illustrating the principle of rotation detection in the torque sensors according to the first to third embodiments of the present invention.
Figure 3B:
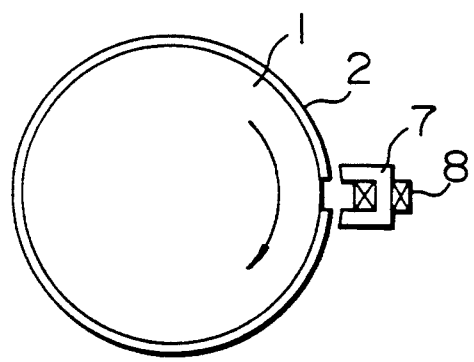
Figure 3C:
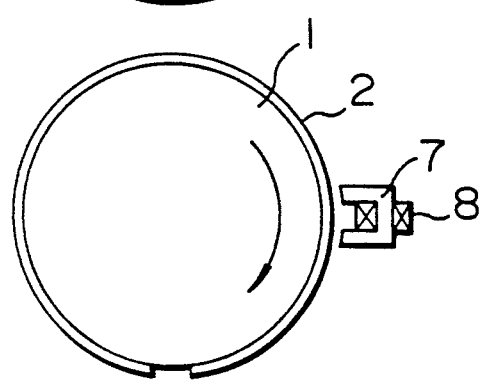

FIGS. 3A to 3C illustrate the principle of rotation detection in the torque sensor of the present embodiment. The figures show different states when the torque transmission shaft 1 is rotating. In the cases shown in FIGS. 3A and 3C, the magnetic core 7 and the rectangle-shaped amorphous magnetic alloy strip 2 form a magnetic circuit through spaces. In the case shown in FIG. 3B, a magnetic circuit includes small portion of the rectangle-shaped amorphous magnetic alloy strip 2 and therefore has a larger space portion. Accordingly, impedance values $Z_a$ and $Z_c$ in FIGS. 3A and 3C become substantially equal to each other but an impedance value $Z_b$ in FIG. 3B becomes smaller than $Z_a$ and $Z_c$. The state shown in FIG. 3B appears, at every rotation of the shaft 1. Therefore, a rotation (or r.p.m.) of the shaft 1 can be measured by measuring the above-mentioned change in impedance. In the measurement of the rotation, the impedance value of the rotation detection coil 8 changes depending upon the magnitude of the value of a torque applied to the torque transmission shaft 1 and/or due to a variation of a gap or interval between the transmission shaft 1 and the magnetic core 7 which variation may occur due to the rotation of the shaft 1. Accordingly, it is necessary to design the structure so that the impedance value $Z_b$ in the state shown in FIG. 3B takes a small value over a possible range of the above-mentioned change in impedance value. This condition is satisfied in the case where the length or distance between the magnetic poles of the magnetic core 7 is equal to or smaller than the length of the gap 3 in the circumferential direction.

Figure 4A:
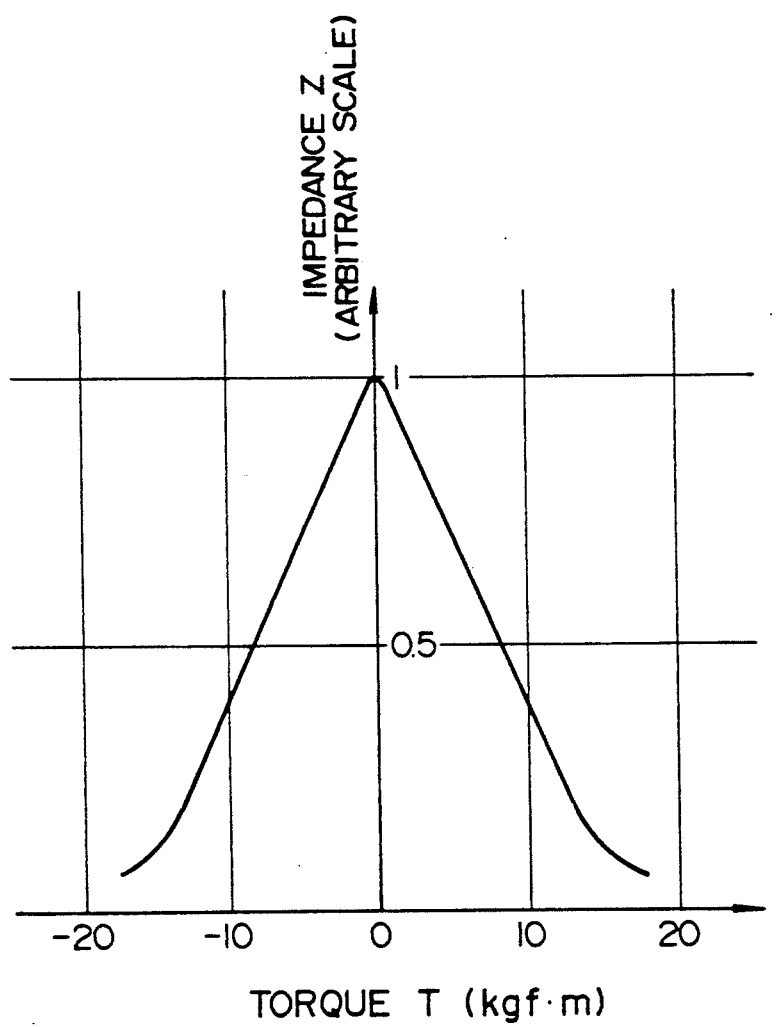
FIG. 4A is a graph showing a relationship between the torque and the impedance value in the torque sensor according to the first embodiment of the present invention.
Figure 4B:
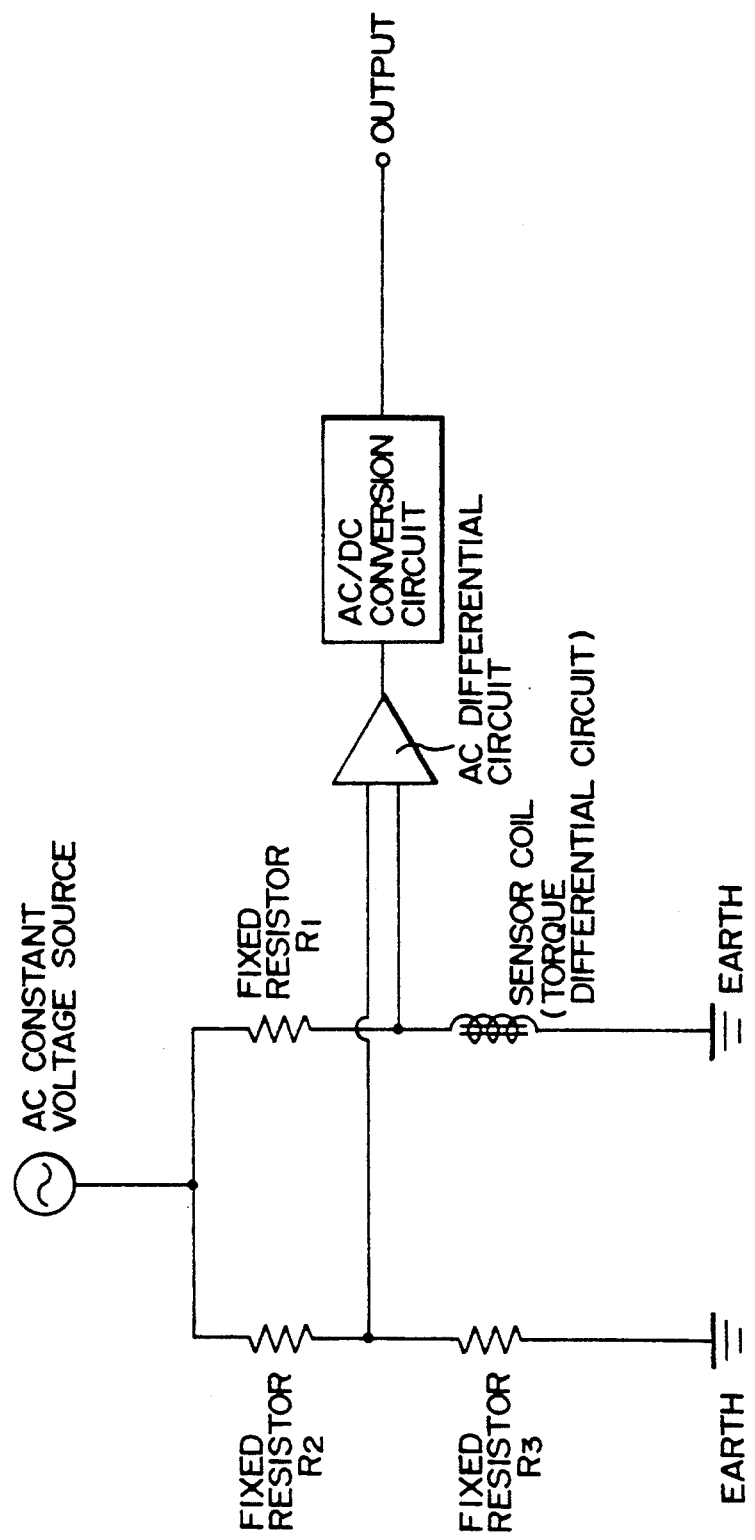
FIG. 4B is a circuit diagram showing a torque detection circuit.
Figure 4C:
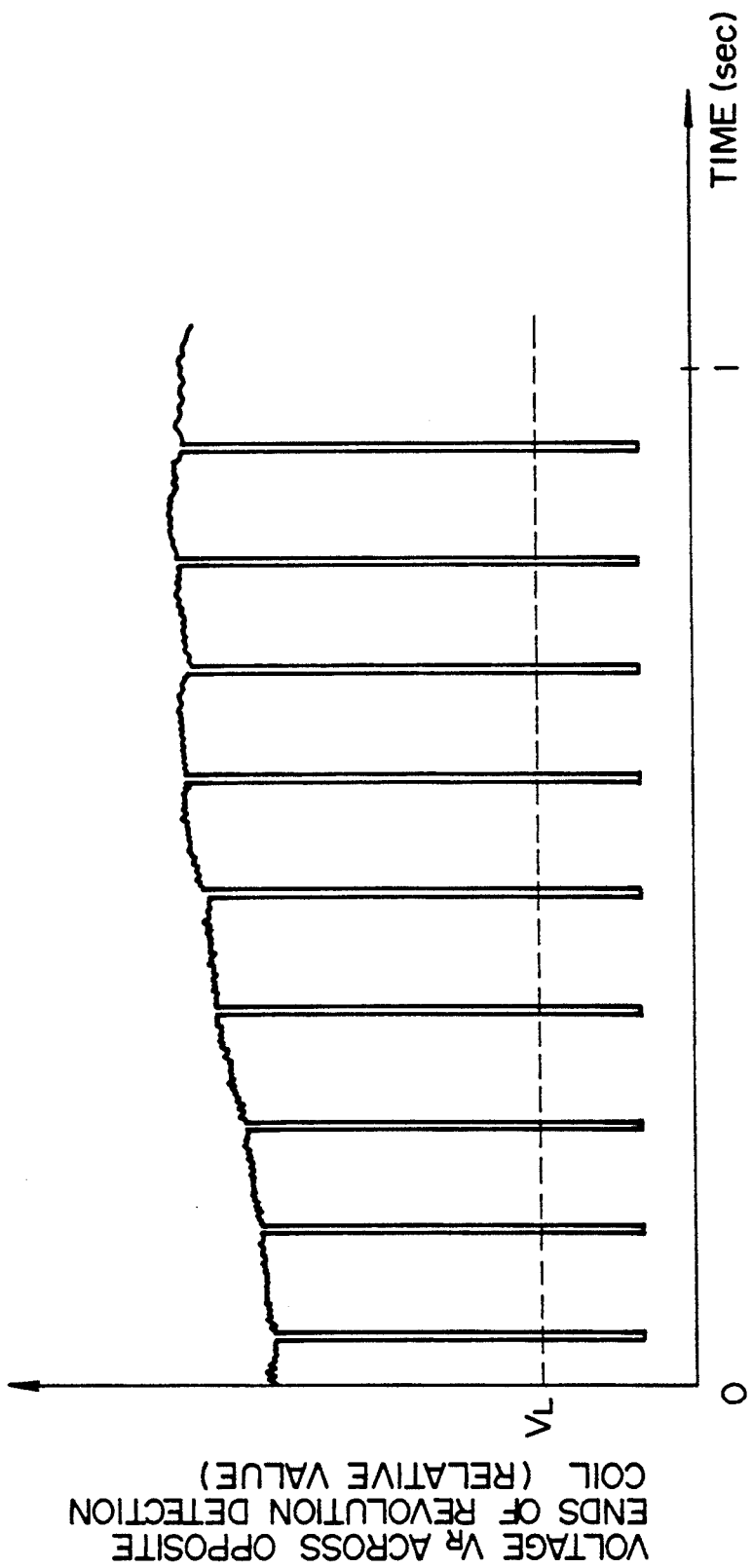
FIG. 4C shows a change of a voltage across opposite ends of a rotation detection coil.
Figure 4D:
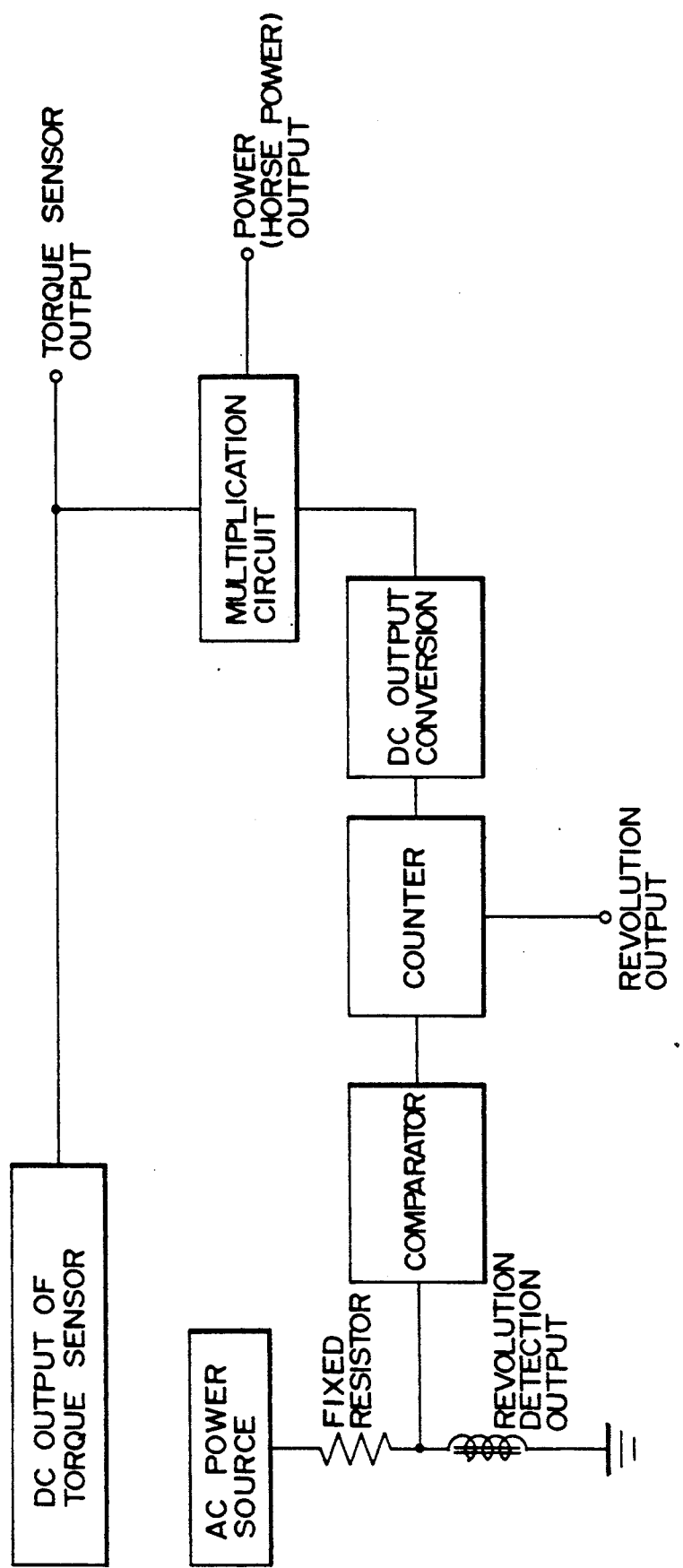
FIG. 4D is a block diagram of a circuit for outputting a torque, a rotation and a power.

FIG. 4a shows a relationship between the torque and the impedance value in the torque sensor of the present embodiment. This relationship is obtained with a inaccuracy of less than ±1% F.S. (full scale) both when the torque transmission shaft is stationary and when it is rotating. This high accuracy is obtained since the in-plane compressive stress is always applied to or liberated in the amorphous magnetic alloy strip in the working temperature region, as has been mentioned above. If such a means is not provided, the accuracy of the sensor is deteriorated. The torque detection FIG. 4B to output the value of a torque as a DC voltage. FIG. 4C shows a change of a voltage across opposite ends of the rotation detection coil 8 in the case where the coil 8 is connected to an a.c. power source in series with a fixed resistor as shown in FIG. 4D. It is seen that spike-like voltage drops are produced due to the rotation. In order to detect the frequency of a unit time at which the inter-end voltage across the opposite ends of the rotation detection coil 8 becomes smaller than a threshold voltage value $V_L$ below a variation of the inter-end voltage of the coil 8 caused by the variation in torque and the rotation, the inter-end voltage of the coil 8 is passed through a comparator and a counter. Thereby, the rotation can be detected. Also, a power can be outputted in such a manner that an output of the counter is converted into a DC voltage and this DC voltage and a DC voltage obtained through conversion from an average torque value in a sampling time are subjected to a multiplication processing in a multiplication circuit. A block diagram of such a circuit is shown in FIG. 4D.

In this manner, there can be constructed a sensor which can simultaneously detect a torque with a high accuracy and the revolution of the torque transmission shaft and can determine a power at the same time. These three outputs can be individually derived or obtained.

Figure 5A:
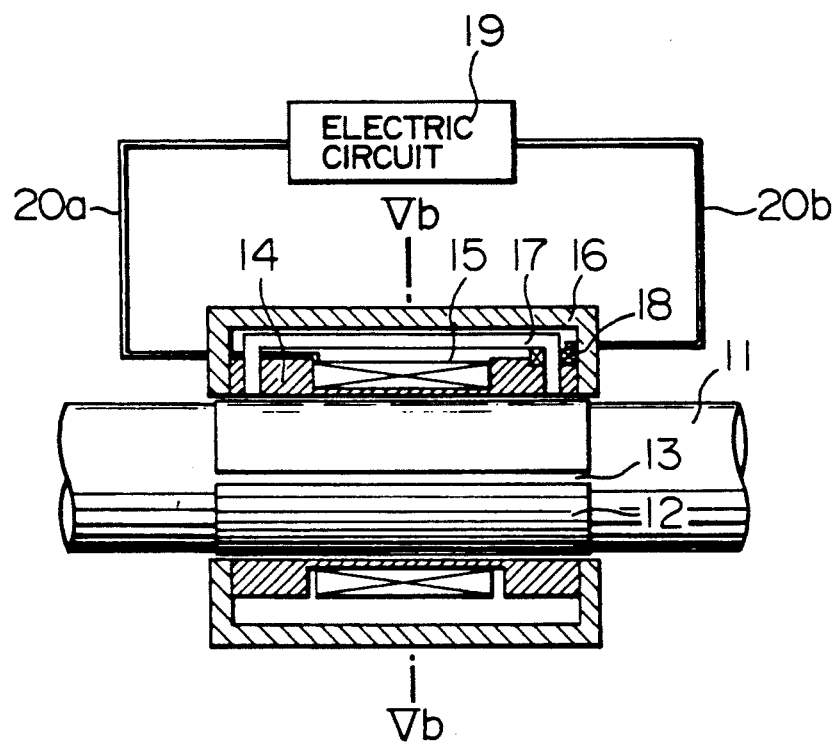
FIG. 5A is a view showing the structure of the torque sensor according to the second embodiment of the present invention.
Figure 5B:
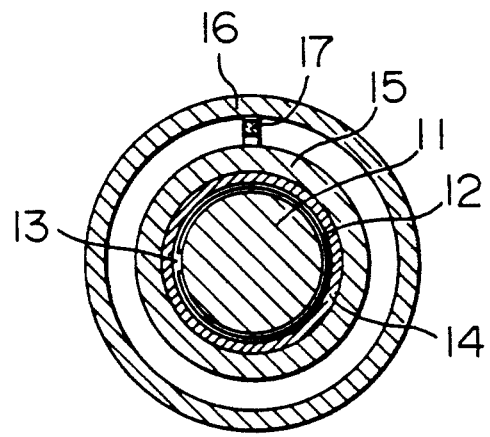
FIG. 5B is a cross section taken along line B—B in FIG. 5A.

Next, a second embodiment of the present invention will be explained in reference to FIGS. 5A and 5B.

In the Figures, reference numeral 11 denotes a torque transmission shaft made of steel (JIS S45C) which has a linear thermal expansion coefficient of $12.0\times10^{-6}$ (1/°C.). Numeral 12 denotes a rectangle-shaped amorphous magnetic alloy strip which has a linear thermal expansion coefficient of $11.2\times10^{-6}$ (1/°C.), a saturation magnetostriction constant of $12\times10^{-6}$ and a composition of $Fe_{40}Ni_{35}Cr_4Si_{12.5}B_{8.5}$. The amorphous magnetic alloy strip 12 is bonded to the torque transmission shaft 11 by means of an addition polymerization type polyimide series bonding agent. The bonding is conducted in a manner similar to that in the first embodiment, that is, at a temperature higher than the upper limit temperature of a working temperature region of a sensor by several-ten degrees, centrigrade, so that an in-plane compressive stress is always liberated in the working temperature region of the sensor. Like the first embodiment, the bonding is made so that a gap 13 is formed. Numeral 14 denotes a bobbin, numeral 15 a torque detection coil wound around the bobbin 14, and numeral 16 a ferrite member having a high magnetic permeability. The principle of torque detection in the present embodiment is similar to that in the first embodiment. Numeral 17 denotes a " " or "U" shaped magnetic core having a high magnetic permeability. The magnetic core 17 has a thickness which is about one half of the length of the gap 13 in a circumferential direction. The magnetic core 17 is disposed outside of the amorphous magnetic alloy 12 in no contact therewith through a space. Further, a rotation detection coil 18 is wound around the magnetic core 17. Numeral 19 denotes an electric circuit which includes circuits for detection of a torque, a rotation and a power. Numerals 20a and 20b denote connection conductors.

The principle of torque detection in the present embodiment is the same as that in the first embodiment. On the other hand, the principle of rotation detection in the present embodiment is similar to that in the first embodiment but is different therefrom in that a magnetic circuit for rotation detection is formed in a direction of length of the shaft. In a state in which the shaft 11 is rotating, the magnetic core 17 and the amorphous magnetic alloy strip 12 form a magnetic circuit through spaces. However, in the case where the gap 13 and the magnetic core 17 coincide with each other or are brought into close proximity to each other in a radial direction, the magnetic resistance of the magnetic circuit becomes large and hence the impedance of the coil has a large change unlike the other case. By measuring this change, the rotation can be measured.

In this manner, there can be constructed a sensor which can simultaneously detect a torque and the rotation of the torque transmission shaft and can determine a power at the same time by using an operating circuit similar to that used in the first embodiment. These three outputs can be individually derived.

Figure 6A:
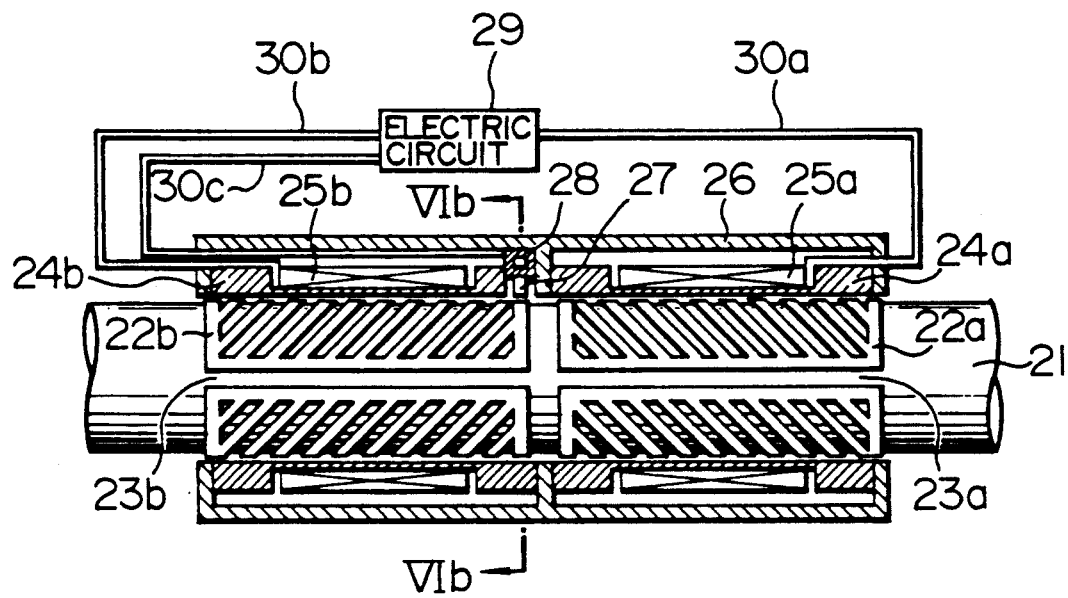
FIG. 6A is a view showing the structure of the torque sensor according to the third embodiment of the present invention.
Figure 6B:
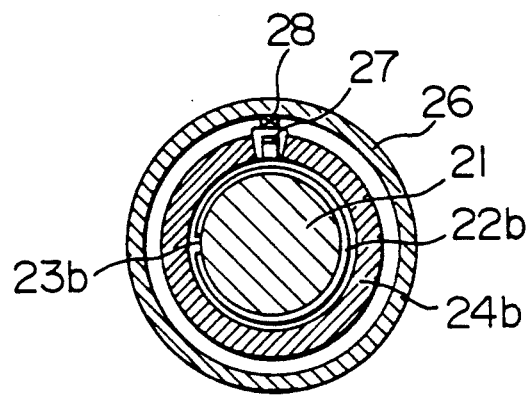
FIG. 6B is a cross section taken along line C—C in FIG. 6A.

Further, a third embodiment of the present invention will be explained in reference to FIGS. 6A and 6B.

Figure 2B:
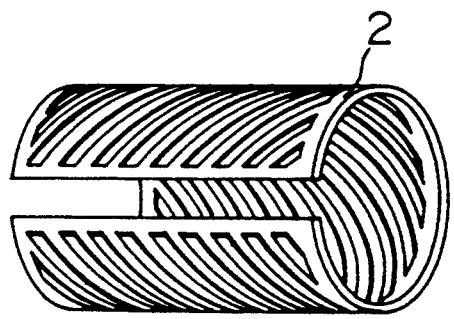
FIG. 2B is a view showing a rectangle-shaped amorphous magnetic alloy strip which is used in a third embodiment of the present invention and has oblique slits inclined at 45°, the curvature of a surface of the amorphous magnetic alloy strip being made the same as that of the surface of a torque transmission shaft by annealing.
Figure 7:
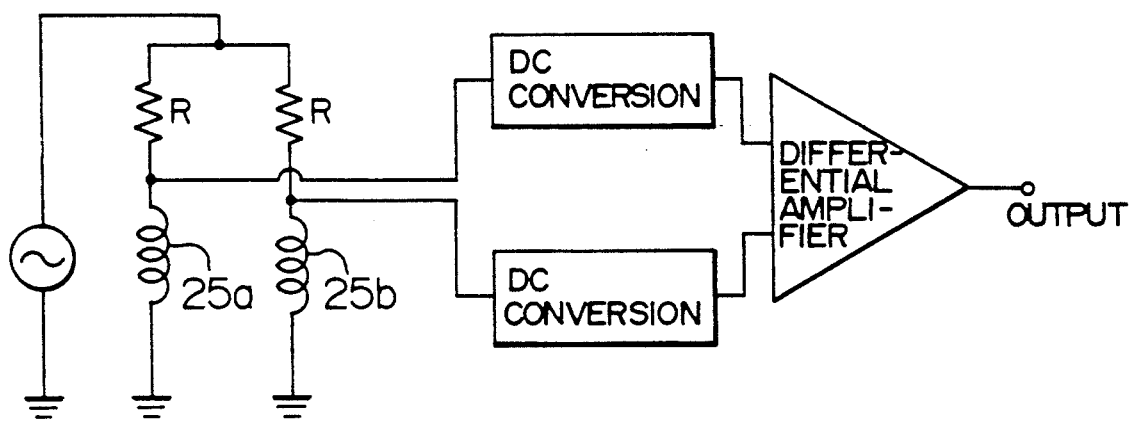
FIG. 7 is a circuit diagram showing a torque detection circuit used in the third embodiment.
Figure 8:
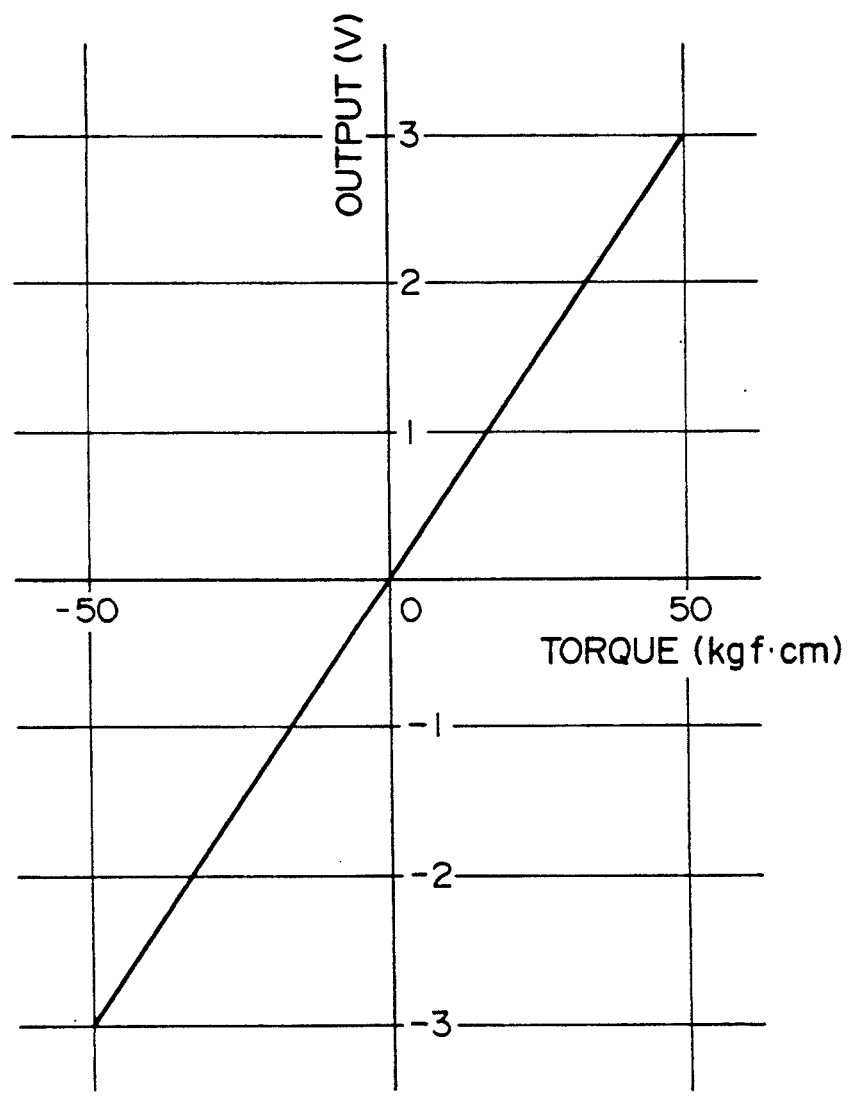
FIG. 8 is a graph showing the output characteristic of the torque sensor according to the third embodiment.

In the Figures, reference numeral 21 denotes a rotating shaft of 10 mm diameter for torque transmission made of steel (JIS S35C). The linear thermal expansion coefficient of the torque transmission shaft 21 is $12.0\times10^{-6}$ (1/°C.). Numerals 22a and 22b denote rectangle-shaped amorphous magnetic alloy strips each of which has a linear thermal expansion coefficient of $11.2\times10^{-6}$ (1/°C.), a saturation magnetostriction constant of $12\times10^{-6}$ and a composition of $Fe_{40}Ni_{35}Cr_4Si_{12.5}B_{8.5}$. The amorphous magnetic alloy strips 22a and 22b have their oblique slits which are provided at ±45° symmetrically with each other. Each of the amorphous magnetic alloy strips 22a and 22b is configured into a form as shown in FIG. 2B and is thereafter bonded to the torque transmission shaft 21 by means of an addition polymerization type polyimide series bonding agent. The bonding is conducted in a manner similar to that in the first embodiment, that is, at a temperature higher than the upper limit temperature of a working temperature region of a sensor by several-ten degrees, centigrade, so that an in-plane compressive stress is always liberated in the working temperature region of the sensor. Like the first embodiment, the bonding is made so that gaps 23a and 23b are formed. Numerals 24a and 24b denote bobbins, numerals 25a and 25b torque detection coils wound around the bobbins 24a and 24b, and numeral 26 a ferrite member which has a high magnetic permeability. The principle of torque detection in the present embodiment is similar to that in the first or second embodiment. In the present embodiment, however, since shape anisotropies of ±45° in obliqueness are provided, it is possible to simultaneously detect the magnitude of a torque and the direction of the torque by use of a differential circuit as shown in FIG. 7. An output characteristic of the differential circuit is shown in FIG. 8. Numeral 27 denotes a horseshoe-shaped magnetic core which is made of ferrite and has a high magnetic permeability. A distance between magnetic poles of the magnetic core 27 is approximately equal to the length of the gap 23b in a circumferential direction and the magnetic core 27 is disposed outside of the rectangle-shaped amorphous magnetic alloy strip 22b in no contact therewith through a space. Further, a rotation detection coil 28 is wound around the magnetic core 27. Numeral 29 denotes an electric circuit which includes circuits for detection of a torque, a rotation and a power. Each of the coils 25a, 25b and 28 are energized at 30 kHz. Numerals 30a and 30b denote conductors which connect the torque detection coils 25a and 25b to the electric circuit 29, and numeral 30c denotes a conductor which connects the rotation detection coil 28 to the electric circuit 29. The principle of rotation detection in the present embodiment is quite the same as that in the first embodiment.

According to the present embodiment, there can be constructed a sensor which can simultaneously detect the direction and magnitude of a torque and the rotation of the torque transmission shaft and can determine a power in either positive or negative direction of the torque magnitude by using an operating circuit similar to that used in the foregoing embodiments. These three outputs can be individually derived.

Figure 9A:
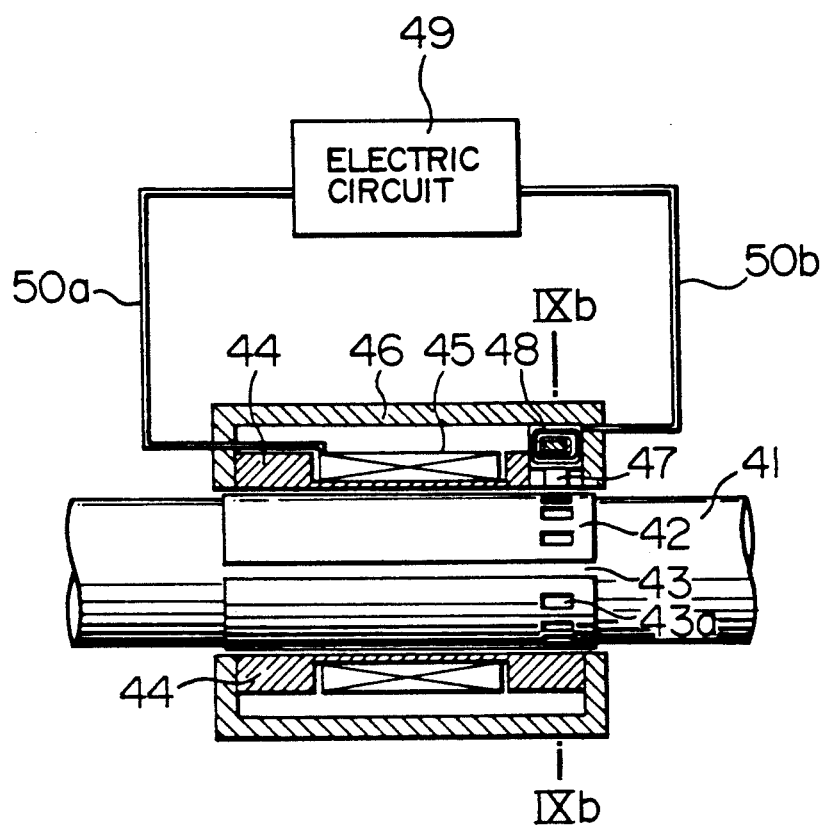
FIG. 9A is a view showing the structure of a torque sensor according to a fourth embodiment of the present invention.
Figure 9B:
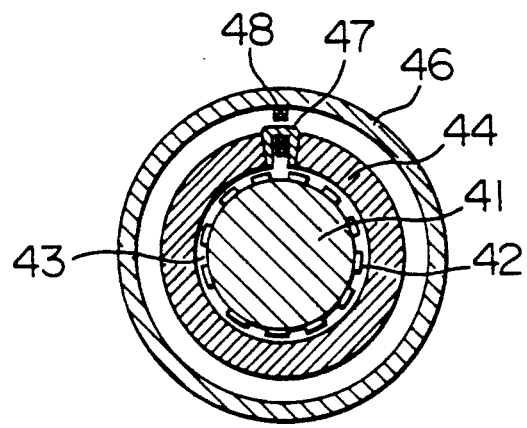
FIG. 9B is a cross section taken along line D—D in FIG. 9A.

A fourth embodiment of the present invention will be explained in reference to FIGS. 9A and 9B.

Figure 10A:
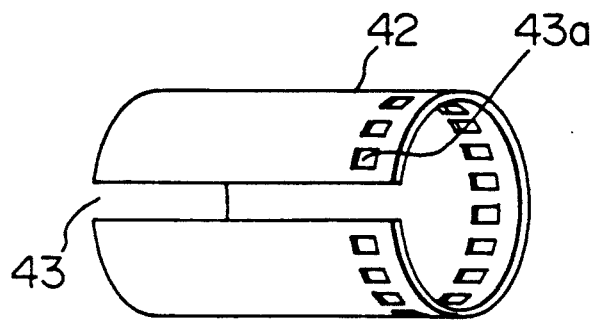
FIG. 10A is a view showing an Ni-Fe magnetic alloy strip which is used in the fourth embodiment and is provided with small rectangular holes, the curvature of a surface of the magnetic alloy strip being made the same as that of the surface of a torque transmission shaft by annealing.
Figure 10B:
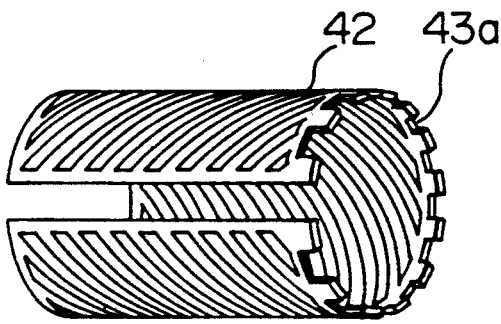
FIG. 10B is a view showing a rectangle-shaped amorphous magnetic alloy strip which is used in a fifth embodiment of the present invention and has oblique slits inclined at 45° and " " or "U" shaped hollows or notches, the curvature of a surface of the amorphous magnetic alloy strip being the same as that of the surface of a torque transmission shaft by annealing.

In the Figures, reference numeral 41 denotes a torque transmission shaft which is made of titanium and has a diameter of 30 mm. Numeral 42 denotes a rectangle-shaped magnetic alloy strip which has small rectangular holes 43a formed therein at equal intervals, as shown in the Figures. The magnetic alloy strip 42 is made of 45%Ni-Fe and has a thickness of 50 μm. The magnetic alloy strip 42 has a linear thermal expansion coefficient of $7.9 \times 10^{-6}$ (1/°C.) and a positive saturation magnetostriction constant. The magnetic alloy strip 42 is bonded to the torque transmission shaft 41 by means of an addition polymerization type polyimide series bonding agent so that an in-plane compressive stress is always liberated in the strip 42 as in the foregoing embodiments. The bonding is made so that the rectangle-shaped magnetic alloy strip 42 is configured into a cylindrical form as shown in FIG. 10A and a gap 43 is formed. The circumferential length of each of the small rectangular holes 43a formed in the rectangle-shaped magnetic alloy strip 42 is equal to the length of the gap 43 in a circumferential direction. The principle of torque detection in the present embodiment is similar to that in the first embodiment. Numeral 44 denotes a bobbin around which a torque detection coil 45 is wound. Numeral 46 denotes an Ni-Fe series magnetic material member which has a high magnetic permeability. Numeral 47 denotes a horseshoe-shaped magnetic core which is made of ferrite and has a high magnetic permeability. A distance between magnetic poles of the magnetic core 47 is approximately equal to the length of each of the gap 43 and the small rectangular holes 43a in the circumferential direction, and the magnetic core 47 is disposed outside of the rectangle-shaped 45%Ni-Fe magnetic alloy strip 42 in no contact therewith through a space. Further, a rotation detection coil 48 is wound around the magnetic core 47. Numeral 49 denotes an electric circuit which includes circuits for detection of a torque and a rotation. The coils 45 and 48 are energized at 10 kHz. Numerals 50a and 50b denote conductors which connect the torque detection coil 45 and the rotation detection coil 48 to the electric circuit 49. Notches or hollows 43a formed at one side of the magnetic alloy strip as shown in FIG. 10B may be used instead of the rectangular holes 43a shown in FIG. 10A.

Figure 11A:
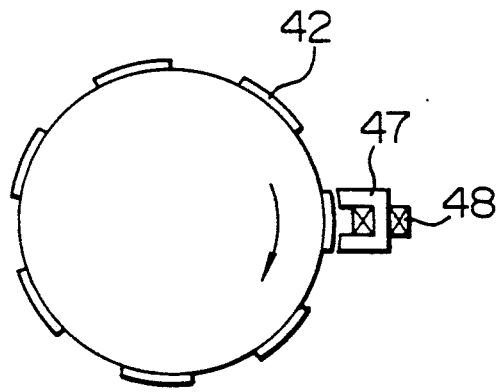
FIGS. 11A and 11B are views illustrating the principle of rotation detection in the torque sensors of the fourth and fifth embodiments.
Figure 11B:
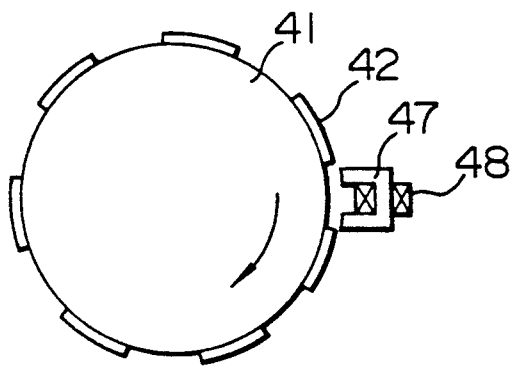

FIGS. 11A and 11B illustrate the principle of rotation detection in the torque sensor of the present embodiment. The Figures show typical different states when the shaft 41 is rotating. In the case shown in FIG. 11A, the magnetic core 47 and the rectangle-shaped 45%Ni-Fe magnetic alloy strip 42 form a magnetic circuit through a space. In the case shown in FIG. 11B, a magnetic circuits include little portion of the rectangle-shaped 45%Ni-Fe magnetic alloy strip 42 and therefore has a larger space portion. Accordingly, an impedance value $Z_b$ in FIG. 11B becomes smaller than an impedance value $Z_a$ in FIG. 11A. The state shown in FIG. 11B appears the number of the small rectangular holes 43a plus one times for each rotation of the shaft 41. Therefore, a rotation (or r.p.m.) of the shaft 41 can be measured by measuring the above-mentioned change in impedance. As a rotation detection circuit may be used a circuit used in the first embodiment. However, since the number of pulses produced during one rotation amounts to the number of the small rectangular holes 43a plus one, the rotation can be detected with a higher accuracy. In the present embodiment, the provision of the gap 43 is not indispensable. Namely, the rotation detection is similarly possible even if only the small rectangular holes 43a are used. However, even if the gap is made smaller or minimum in the case where the rectangle-shaped 45%Ni-Fe magnetic alloy strip is used, a magnetic resistance exists at the reduced or minimized gap portion. Therefore, it is preferable to utilize the gap for rotation detection.

In this manner, it is possible to simultaneously detect a torque and the rotation of the torque transmission shaft in a manner approximately similar to that in the first embodiment, thereby making it possible to determine a power. These three outputs can be individually derived.

Figure 12A:
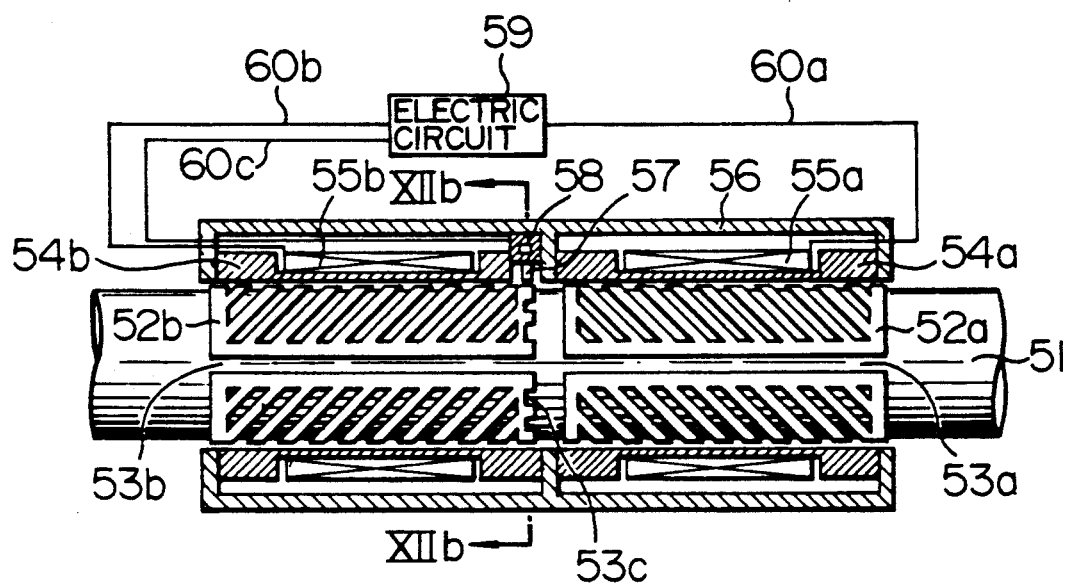
FIG. 12A is a view showing the structure of the torque sensor according to the fifth embodiment of the present invention.
Figure 12B:
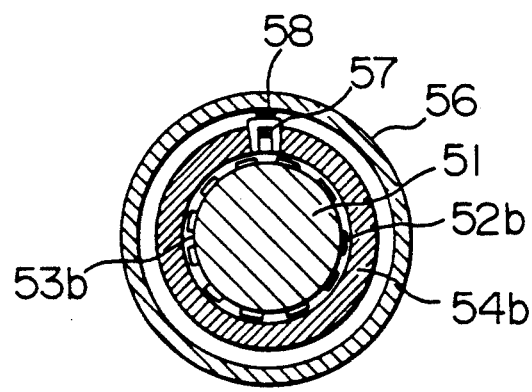
FIG. 12B is a cross section taken along line E—E in FIG. 12A.
Figure 13:
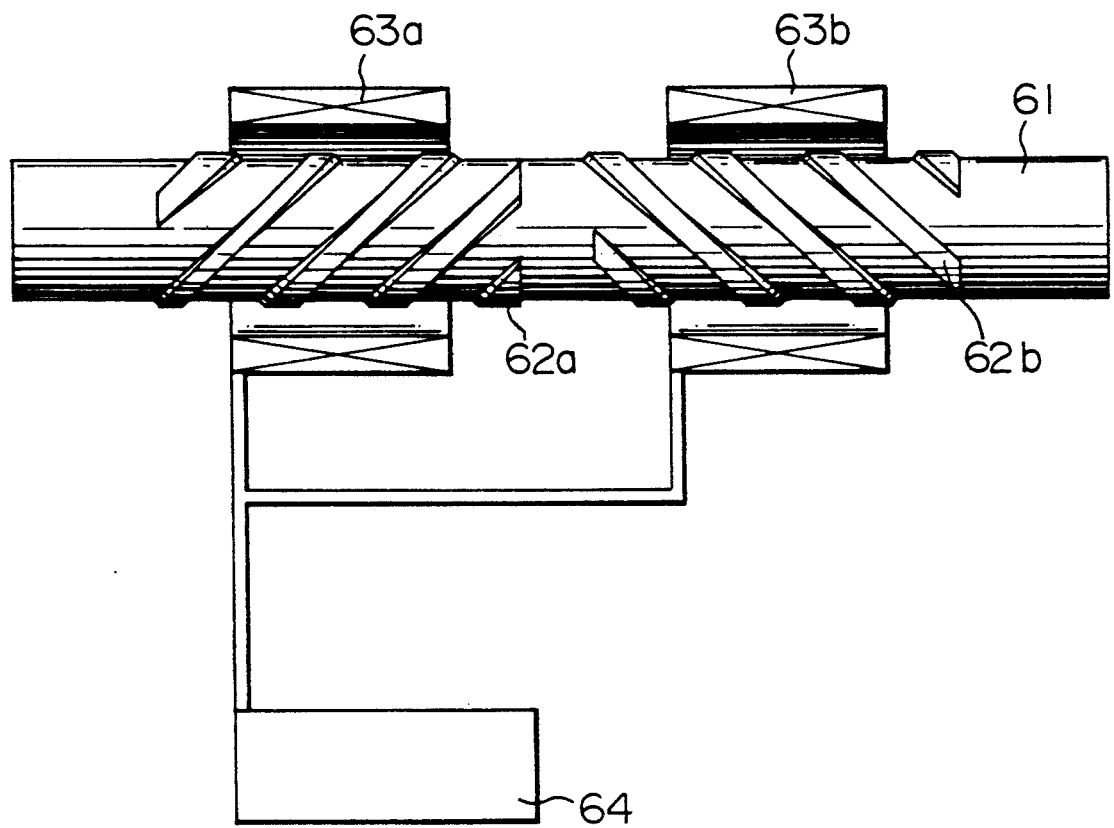
FIG. 13 is a view for explaining the construction of the conventional torque sensor.

A fifth embodiment of the present invention will be explained in reference to FIGS. 12A and 12B.

In the Figures, reference numeral 51 denotes a 10 mm diameter torque transmission shaft made of steel (JIS S35C). Numerals 52a and 52b denote rectange-shaped Fe-Ni-Si-B series amorphous magnetic alloy strip each of which has a linear thermal expansion coefficient of $11.0 \times 10^{-6}$ (1/°C.) and a saturation magnetostriction constant $16 \times 10^{-6}$. The amorphous magnetic alloy strips 52a and 52b have their oblique slits which are provided at ±45° symmetrically with each other. The rectangle-shaped amorphous magnetic alloy strips are constructed such that " " or "U" shaped hollows or notches 53c are formed at one side of the rectangle-shaped amorphous magnetic alloy strip 52a and each of the strips 52a and 52b is configured into a cylindrical form, as shown in FIG. 10B, and is thereafter bonded to the torque transmission shaft 51 by means of an addition polymerization type polyimide series bonding agent so that an in-plane compressive stress is always liberated in a working temperature region of a sensor. Like the first embodiment, the bonding is made so that gaps 53a and 53b are formed. The length of each of the gaps 53c in a circumferential direction is equal to that of the gap 53b in the circumferential direction. Numerals 54a and 54b denote bobbins, numerals 55a and 55b torque detection coils wound around the bobbins 54a and 54b and numeral 56 a ferrite member which has a high magnetic permeability. The principle of torque detection in the present embodiment is similar to that in the third embodiment. Numeral 57 denotes a horseshoe-shaped magnetic core which is made of ferrite and has a high magnetic permeability. A distance between magnetic poles of the magnetic core 57 is about one half of the length of each of the hollows 53b and 53c in the circumferential direction and the magnetic core 57 is disposed outside of the rectangle-shaped amorphous magnetic alloy strip 52b in no contact therewith through a space. Further, a rotation detection coil 58 is wound around the magnetic core 57. Numeral 59 denotes an electric circuit which includes circuits for detection of a torque, a rotation and a power. The coils 55a, 55b and 58 are energized at 30 kHz. Numerals 60a and 60b denote conductors which connect the torque detection coils 55a and 55b to the electric circuit 59, and numeral 60c denotes a conductor which connects the rotation detection coil 59 to the electric circuit 59. The principle of rotation detection in the present embodiment is similar to that in the fourth embodiment.

In this manner, the magnitude and direction of a torque and a rotation can be measured by the sensor of the present embodiment. Thereby, a power too can be determined from the product of the magnitude of the torque and the rotation in a manner similar to that in the foregoing embodiments. These three outputs can be individually derived.

The foregoing embodiments have been mentioned in conjunction with the case where an amorphous magnetic alloy strip or a 45%Ni-Fe magnetic alloy strip is used as a magnetic material strip having magnetostriction. The present invention is not limited to those magnetic alloy strips. However, the disclosed alloy has a high magnetic permeability and is a material suitable for use in a rotation detection torque sensor of the present invention.

Also, the foregoing embodiments have been mentioned in conjunction with the case where there is used a magnetic material strip having magnetostriction the principal outer periphery of which is configured or shaped into a rectangle. However, a similar effect can be expected even if a parallelogram-shaped magnetic material strip is used. Further, in the foregoing embodiments, small rectangular holes or " " or "U" shaped hollows or notches have been used for the detection of a revolution with a high accuracy. However, a similar effect can be expected even if the shape of the hole, hollow or notch is one or the combination of a variety of polygons which include circles, ellipses, triangles, quadrangles, and so on.

Furthermore, the technique in which an in-plane compressive stress is always applied to or liberated in a magnetic material strip having magnetostriction in a working temperature region by virtue of the control of a bonding condition in order to enable the detection of a torque with a high accuracy, may be equally applied to magnetic material strips having magnetostriction other than the magnetic material strips having magnetostriction which have been mentioned in conjunction with the foregoing embodiments. As a result, a similar effect can be expected. This technique is also indispensable to a sensor for detection of a power with a high accuracy.

We claim:

1. A torque sensor with multiple functions capable of detecting a torque together with a rotational speed of a shaft, comprising:

a torque transmission shaft;

a magnetic material strip of a magnetic material having magnetostriction and a shape of a rectangle or parallelogram, said magnetic material strip being adhered to another outer peripheral surface of said torque transmission shaft in a circumferential direction with opposite ends of said magnetic material strip facing each other with a gap interposed therebetween;

a first coil concentrically wound around said torque transmission shaft and positioned to change in inductance with a change in magnetic permeability of the magnetic material strip upon application of an a.c. voltage to said first coil;

first electrical circuit means connected to said first coil for detecting the torque of said torque transmission shaft by detecting a change in impedance of said first coil representing a change in magnetic characteristic of said magnetic material strip caused by a stress transmitted from said torque transmission shaft to said magnetic material strip;

a U-shaped magnetic core having a second coil wound therearound, said second coil being supplied with an a.c. voltage independently of said first electrical circuit means, said U-shaped magnetic core being disposed outside of said magnetic material strip and not in contact therewith to detect said gap formed between the opposite ends of said magnetic material strip; and second electrical circuit means connected to said second coil for detecting the rotational speed of said torque transmission shaft by detecting a change in voltage across said second coil representing passing of said gap of said magnetic material strip.

2. A torque sensor according to claim 1, wherein the linear thermal expansion coefficient of said torque transmission shaft is larger than the linear thermal expansion coefficient of said magnetic material strip having magnetostriciton and said magnetic material strip is bonded to said torque transmission shaft in a temperature higher than working temperatures of the sensor, so that an in-plane compressive stress is always liberated in a working temperature region in said magnetic material strip having magnetostriction.

3. A torque sensor according to claim 1, wherein holes or gaps are formed in said magnetic material strip having magnetostriction and said holes or gaps are detected by magnetic means.

4. A torque sensor according to claim 1, wherein the magnetic material strip secured to the surface of said torque transmission shaft includes an amorphous magnetic alloy having magnetostriction.

5. A torque sensor as claimed in claim 1, further comprising a torque detection signal generation circuit for generating a torque detection signal from an output of the first detection coil, a rotation detection signal generation circuit for generating a rotation detection signal from the second detection coil, and a multiplication circuit for multiplying an output of said torque detection signal generation circuit and an output of said rotation detection signal generation circuit by each other to generate a power detection signal.

6. A torque sensor as claimed in claim 2, further comprising a torque detection signal generation circuit for generating a torque detection signal from an output of the first detection coil, a rotation detection signal generation circuit for generating a rotation detection signal from the second detection coil, and a multiplication circuit for multiplying an output of said torque detection signal generation circuit and an output of said rotation detection signal generation circuit by each other to generate a power detection signal.

7. A torque sensor as claimed in claim 3, further comprising a torque detection signal generation circuit for generating a torque detection signal from an output of the first detection coil, a rotation detection signal generation circuit for generating a rotation detection signal from the second detection coil, and a multiplication circuit for multiplying an output of said torque detection signal generation circuit and an output of said rotation detection signal generation circuit by each other to generate a power detection signal.

8. A torque sensor as claimed in claim 4, further comprising a torque detection signal generation circuit for generating a torque detection signal from an output of the first detection coil, a rotation detection signal generation circuit for generating a rotation detection signal from the second detection coil, and a multiplication circuit for multiplying an output of said torque detection signal generation circuit and an output of said rotation detection signal generation circuit by each other to generate a power detection signal.

* * * * *